May 5, 1970            H. GILBERT            3,510,835

TIRE TEMPERATURE ALARM SYSTEM

Filed March 6, 1967

INVENTOR.
HARRY GILBERT
BY John F. Jones
ATTY.

United States Patent Office 3,510,835
Patented May 5, 1970

3,510,835
TIRE TEMPERATURE ALARM SYSTEM
Harry Gilbert, Avenue B, Potomac Park,
Cumberland, Md. 21502
Filed Mar. 6, 1967, Ser. No. 620,850
Int. Cl. B60q 1/00, 5/100
U.S. Cl. 340—57        10 Claims

ABSTRACT OF THE DISCLOSURE

A system for warning the operator of a vehicle when a predetermined temperature of the vehicle tire has been reached or exceeded is provided. This system is composed of a temperature sensing device in contact with a portion of the tire, an electromagnet in combination with said sensing device and a power source such that when the sensing device is activated by a predetermined degree of heat in the tire the electromagnet is activated and in turn through its magnetic field activates an induction coil attached to the vehicle which in turn activates a warning device located near the operator.

---

Figure 1:
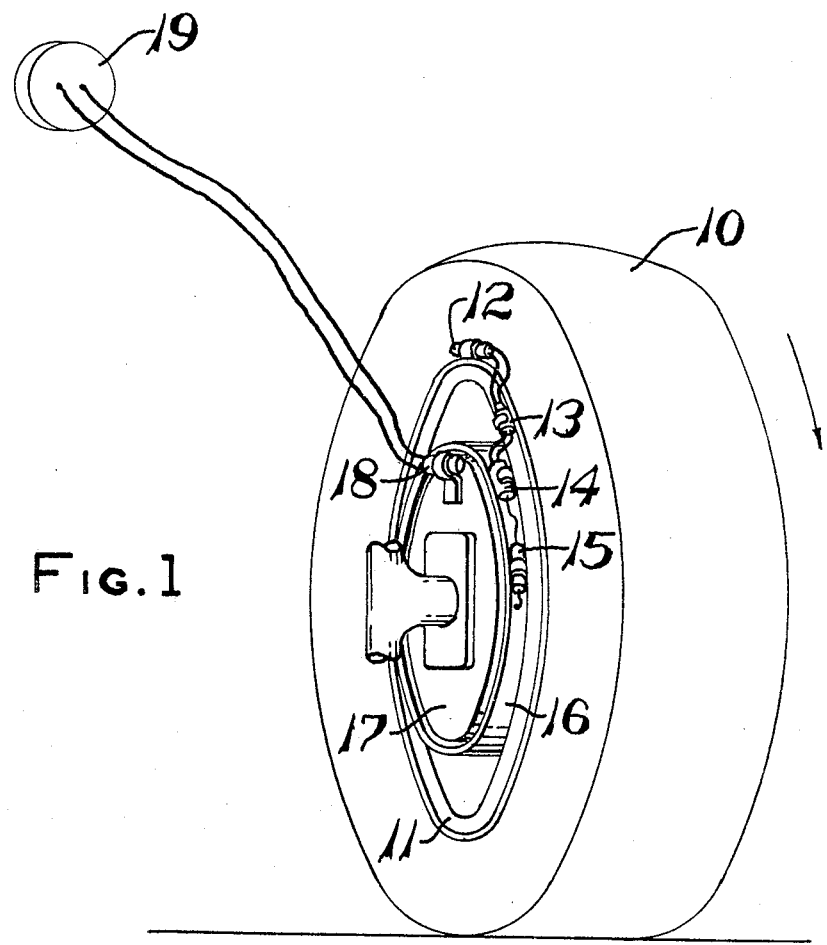

This invention relates to a device for detecting temperature change in a rotating member of a machine and for transmitting this information to the operator of the machine, and more particularly pertains to an inexpensive apparatus which detects excessive heat buildup in a rotating member of a machine such as a pneumatic tire and for transferring this information to the operator of the machine so that corrective action can be taken to prevent damage to the rotating member, the machine and possibly even the operator.

The pneumatic tired wheels on passenger autos, busses or trucks are often subject to excessive heat buildup in the tire structure because of overload, excessive speed, structural failure such as broken tire cords, imperfections or cuts in the tire, damaged wheel rim, ply separation or adhesive failure between the tire cord and the rubber of the tire. Without such a protective device as is provided by the present invention the operator of the machine may be completely unaware that a tire is heating up to the danger point. Thus, he will often continue driving, the tire temperature will continue to rise to the point at which it ruptures catastrophically. This is commonly known as a "blowout" which is the well-known cause of many costly vehicle accidents.

If the vehicle on which a blowout occurs is a dual wheel vehicle such as a truck or bus, the blowout on one tire of the pair almost certainly leads to the blowout of the remaining tire of the pair because of the sudden overloaded condition placed on it.

Another example of a rotating member which may heat up to the danger point is the brake drum on a vehicle. For instance, when one drives in mountainous country, excessive use of the brakes while going down hill can lead to brake failure caused by excessive heat buildup. The device of the present invention will warn the operator that his brake drum is heating up close to the danger point and will alert him to take corrective action before catastrophic loss of control of the vehicle occurs.

Numerous devices have been proposed for warning operators that they are about to have a blowout or that a blowout has occurred on one of the tires of a multiple tire wheel assembly in a vehicle. These prior art devices used in connection with pneumatic tired vehicles have operated on the principle of pressure change or a change in the geometry of the tire and thus are unlike the system of the instant invention. The prior art devices have produced warnings solely by mechanical means. Prior art devices of the types just mentioned are described in U.S. Pats. Nos. 2,731,936; 1,947,760; 1,184,220; 1,025,100; 1,058,571; 1,036,602 and 902,693. The warning device of the instant invention is extremely sensitive and operates on the principle of temperature change rather than the prior art principles of pressure change or change in tire geometry.

An object of this invention is to provide a reliable, simple, inexpensive device for detecting excessive heat buildup or any unwanted change in temperature of a moving part which may lead to malfunction of the machine containing the moving part. A more particular object of this invention is the provision of a device for detecting temperature change in a rotating member such as a wheel of a vehicle and to alert the operator of the vehicle of such temperature change in sufficient time to allow corrective action to be taken.

Figure 2:
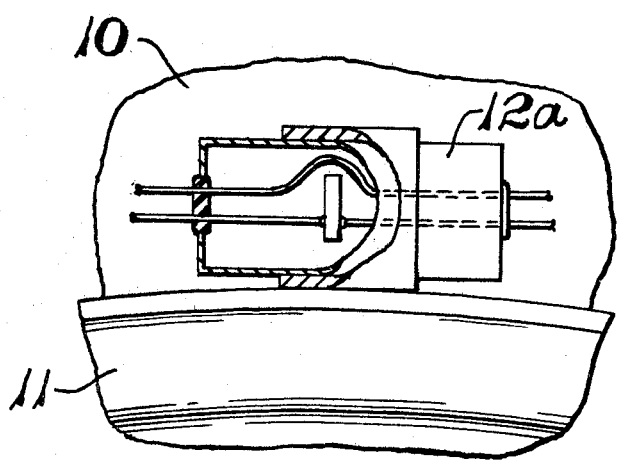

The excessive temperature alarm system of this invention will now be described in more detail with reference to the accompanying drawing which depicts a pneumatic tired wheel of a vehicle as a preferred specific embodiment of the instant invention. FIG. 1 shows in fragmentary schematic perspective a pneumatic tired wheel mounted on a vehicle with sensing device and FIG. 2 shows in fragmentary elevation a particular type of sensing device in more detail.

In the preferred embodiment of the present invention there is provided a tire 10 mounted on a rim 11 having a temperature sensing device 12 mounted on the rim 11, said sensing device 12 being in contact with the inner sidewall of the tire 10 and being grounded to the rim 11. The sensing device 12 is in electrical contact through a coupling 13 with an electromagnet 14 which in turn is in electrical contact with a battery 15 which is grounded to the rotating brake drum 16 and is the source of electrical energy for the electromagnet 14 when the electrical circuit is closed by activation of the sensing device 12.

In the operation of the vehicle, when a predetermined temperature is attained in the sidewall of the tire 10, the sensing device 12 is activated to close the circuit so that an electric current from the battery 15 flows through 12, 13 and 14, thus creating an electromagnetic field in the electromagnet 14.

The tire 10 and rim 11 assembly is mounted on a vehicle having a rotating brake drum 16 and a stationary brake backing plate 17 to which is attached an induction coil 18 and to which in turn is attached by electrical contact in the electrical circuit to the warning device 19. There also may be an additional power source in the circuit containing the induction coil 18 and warning device 19 to amplify the signal produced by the warning device. Such a power source could be the battery and/or generator of the vehicle. When the electromagnet 14 is activated, the magnetic field created activates the induction coil 18 as it passes by during the rotation of the wheel and the activation of the induction coil 18 causes the activation of the warning device 19 which is located in the vicinity of the operator of the vehicle.

At each rotation of the wheel the magnetic lines of force generated by the electromagnet 14 when it is activated by the sensing device 12 pass by the induction coil 18 generating a pulse of electric current in the induction coil circuit. Thus, when the sensor 12 is activated by a predetermined amount of heat and allows current to flow through the electromagnet 14, there will be a pulsed current generated by the induction coil 18 for each revolution of the wheel and this pulsed current will activate the alerting mechanism 19.

FIG. 2 shows as a particular type of temperature sensing device 12a a disc type thermistor which contains leads going to the coupling 13 on one side and to be grounded to the rim 11 on the other side. The thermistor provides electrical resistance to the flow of current which decreases with an increase in the temperature of the thermistor. A particular type of thermistor which is available commercially which would operate satisfactorily in the present system is one in which the resistance to flow of electrical current drops by a factor of 10 with a rise in temperature of 90° F.

In the present invention the heat sensing device 12 may be a thermistor as more fully described above which will conduct an electric current only when the temperature of the tire sidewall reaches the predetermined point and then it conducts sufficient current to complete the circuit and activate the electromagnet. The heat sensing device 12 may also be composed of a solid rod which expands with heat and makes electrical contact with a conductor thus completing the electrical circuit. The heat sensing device 12 may also be a device containing an insulating material such as a wax or a polymer which will melt at the predetermined temperature and will flow away from the electrical contacts allowing them to come together and complete the electrical circuit. The heat sensing device 12 may also be a bimetallic strip with a gap between the two metals which persists until the predetermined temperature is reached at which time the metallic elements will come together because of differential coefficients of expansion and the circuit will be completed. The heat sensing device 12 can be composed of two electrical contacts spaced apart in the presence of a conductive material such as lead or other metal or alloy which is normally solid but will melt and flow under heat to fill the gap between the electrical contacts and thus complete the circuit. In such a device the metal or alloy chosen would be one which melts within the predetermined temperature range. Another type of heat sensing device useful in the present invention is a container holding a gas or fluid within a diaphragm member which expands under the influence of heat thus forcing the metallic diaphragm to make contact with another electrical contact in the device and thus completing the electrical circuit and activating the warning device in the aforementioned manner. Other types of heat sensing elements which are well known to those skilled in the art are useful in the present invention.

The warning device 19 for alerting the operator that the predetermined temperature for the tire has been reached or exceeded can be any of a number of known electrically operated devices which give visual or oral warning to the operator. Such devices include ammeters, milliammeters, warning lights, a radio receiver such as a micro FM radio transmitter whose signal is picked up by an FM receiver, a micro solenoid valve which releases a compressed gas from a cylinder through a constriction thus generating an audible signal, a piezoelectric transducer sound generator such as one which is activated by 3 milliamperes current to generate a sound of 2,800 cycles per second at 70 decibels and the like.

Many other changes and modifications can be made by those skilled in the art without departing from the scope of the present invention.

I claim:

1. An apparatus for detecting predetermined temperature change in a rotating member of a machine, said rotating member being located closely adjacent to a stationary portion of the machine, comprising an electrically operative temperature sensing device in open circuit located in intimate contact with a portion of said rotating member, said sensing device being in electrical communication with an electromagnet also located on said rotating member and a source of electrical energy, induction coil means on said stationary part of the machine for detecting the magnetic field when generated by said electromagnet when said electromagnet is activated by closing of the circuit by thermal action on said sensing device and means for transmitting a signal to a warning device which warns the operator of said machine that the predetermined temperature change has occurred, said electromagnet and said induction coil being so relatively positioned that the electromagnet will pass in close proximity to the induction coil once each revolution of the rotating member.

2. The apparatus of claim 1 wherein the rotating member is a wheel, the machine is a motor vehicle and the means for detecting the magnetic field is an induction coil.

3. The apparatus of claim 2 wherein the rotating member is a pneumatic tire and rim assembly and the temperature sensing device is located in intimate contact with the tire.

4. The apparatus of claim 3 wherein the sensing device is a thermistor.

5. The apparatus of claim 3 wherein the temperature sensing device is composed of a bimetallic strip with a gap between the two metals which persists until the predetermined temperature is reached at which time the metallic elements will come together because of differential coefficients of expansion and complete the electrical circuit.

6. The apparatus of claim 3 wherein the sensing device is composed of two electrical contacts spaced apart in the presence of a conductive material which will melt and flow under heat to fill the gap between the electrical contacts and thus complete the electrical circuit.

7. The apparatus of claim 3 wherein the sensing device has as spaced apart electrical contacts a metallic diaphragm and another metal such that the gas or fluid behind the diaphragm under the influence of heat will cause the diaphragm to expand and make contact with the other electrical contact and thus complete the electrical circuit.

8. The apparatus of claim 3 wherein the warning device is a light.

9. The apparatus of claim 3 wherein the warning device is an ammeter.

10. The apparatus of claim 3 wherein the warning device is a horn.

References Cited

UNITED STATES PATENTS

| | | | |
|---|---|---|---|
| 3,093,812 | 6/1963 | Brown | 340—58 |
| 3,374,460 | 3/1968 | Massoubre | 340—58 |

ALVIN H. WARING, Primary Examiner

U.S. Cl. X.R.

200—136; 340—227.1; 228, 231